Oct. 13, 1942.	C. SAUZEDDE	2,298,314
AUTOMATIC FLUID CONTROL FOR HYDROSTATIC SYSTEMS
Filed Sept. 18, 1939	2 Sheets-Sheet 1
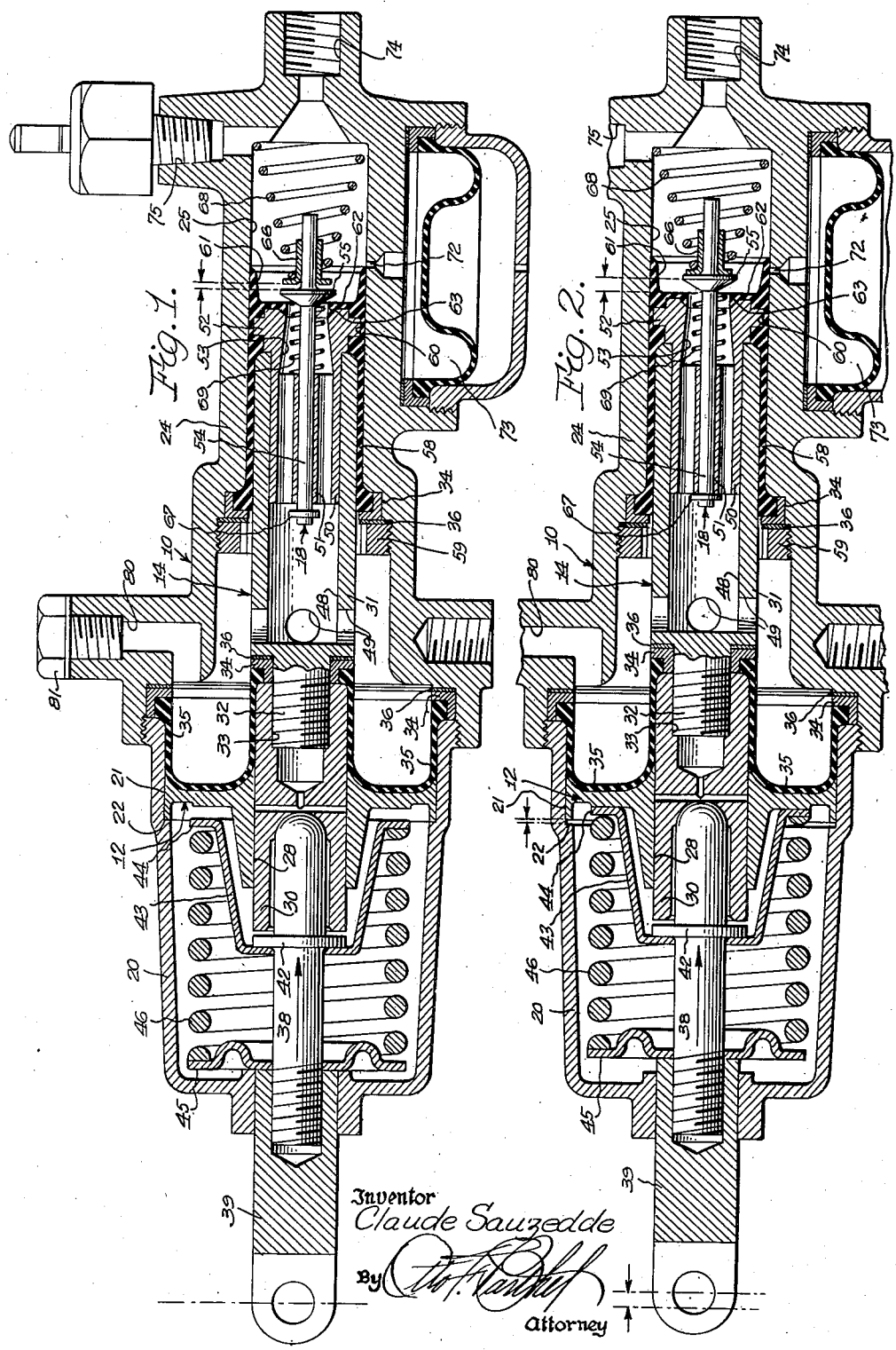
Inventor
Claude Sauzedde
By
Attorney

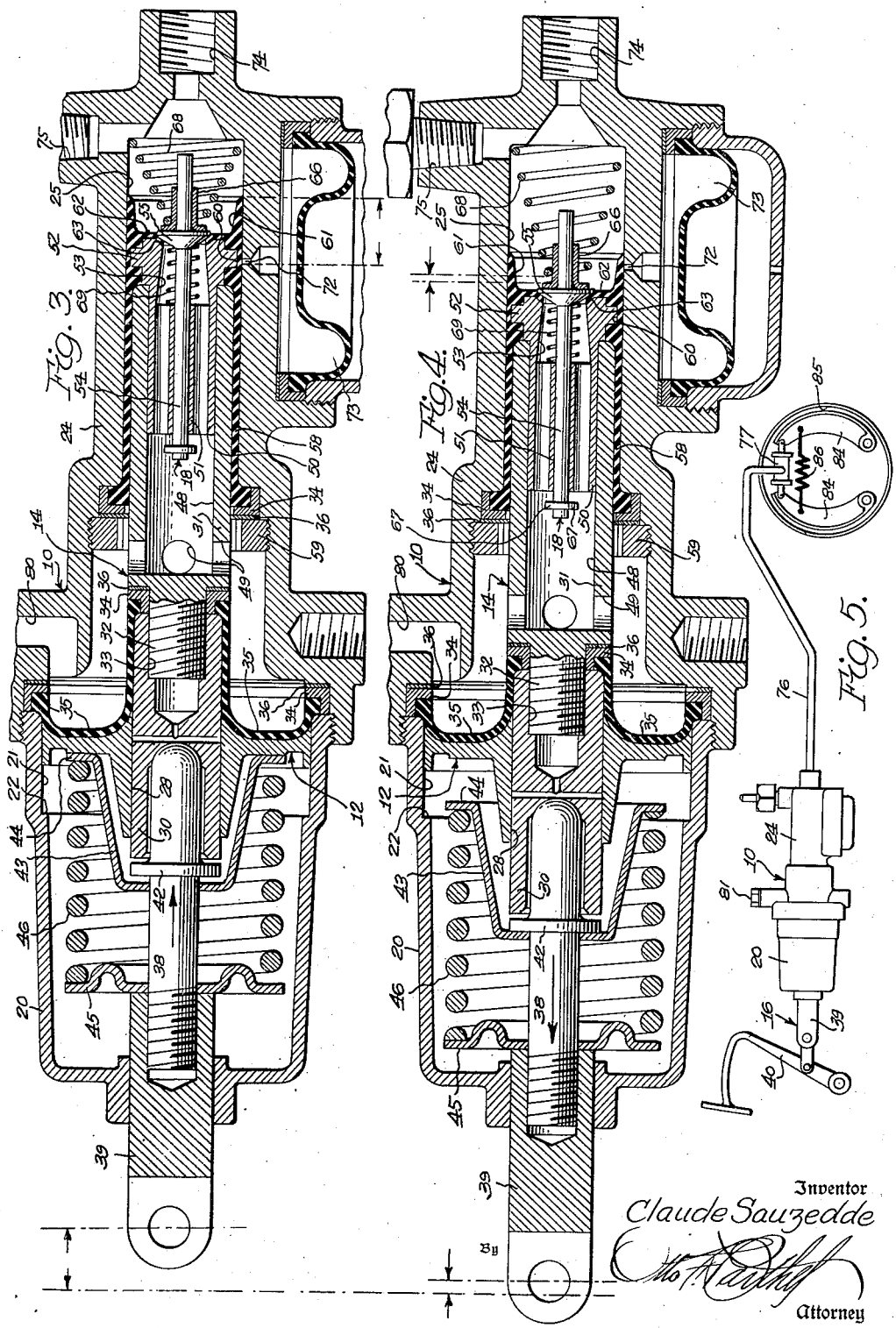

Patented Oct. 13, 1942

2,298,314

UNITED STATES PATENT OFFICE 2,298,314

AUTOMATIC FLUID CONTROL FOR HYDROSTATIC SYSTEMS

Claude Sauzedde, Detroit, Mich., assignor to Detroit Hydrostatic Brake Corporation, Detroit, Mich., a corporation of Michigan Application September 18, 1939, Serial No. 295,471

5 Claims. (Cl. 60—54.6)

This invention relates, in general, to hydrostatic braking systems and, in particular, to a new and improved multistage compressor therefor.

One of the objects of this invention is to improve fluid flow regulation in a hydrostatic braking system so as to improve braking efficiency.

Another object is to provide a new and improved compressor for a hydrostatic braking system which is entirely automatic in operation and which responds for its pressure boosting effect when and only when the brake shoes engage the drums therefor, thereby maintaining maximum braking efficiency under all conditions of shoe wear and adjustment.

Another object is to provide a new and improved compressor for a hydrostatic braking system which is easy to assemble and requires little or no adjustment over long periods of continued use.

Another object is to provide a compressor for a hydrostatic braking system with a new and improved valve mechanism which operates automatically responsive to conditions within the system so as not to be dependent upon the operator's care, attention and intelligence.

Another object is to provide a compressor for a hydrostatic braking system with a new and improved valve mechanism through which fluid flow is entirely dependent upon the existence of clearances between the brake shoes and drums and which fluid flow is stopped immediately and exclusively as a result of the conditions existing in the system when said clearances have been taken up, whereupon the boosting effect of the compressor becomes operative.

Another object is to provide a multi-stage compressor for a hydrostatic braking system with a new and improved valve mechanism which automatically controls the operating stages thereof.

Still other objects and advantages of the invention will become readily apparent from a reference to the following specification taken in conjunction with the accompanying drawings of which there are two (2) sheets and wherein:

Figure 1 is a longitudinal section through the compressor and showing the elements thereof as they appear when the system is at rest;

Fig. 2 is a view showing the elements as they appear slightly after pedal protraction but before clearances at the wheels have been fully taken up;

Fig. 3 is a view showing the elements as they appear at the moment the clearances have been taken up;

Fig. 4 is a view showing the elements as they appear at a selected instant during pedal retraction; and Fig. 5 is a diagrammatic view of a braking system with the compressor incorporated therein.

In Figs. 1 through 4, there is shown a two-stage compressor, generally indicated at 10, which is employable in a hydrostatic braking system, such as is particularly adaptable for a vehicle and diagrammatically illustrated in Fig. 5. In general, compressor 10 comprises primary and secondary pistons, generally indicated at 12 and 14, respectively, an actuating mechanism for said pistons, generally indicated at 16, and a fluid control mechanism, generally indicated at 18.

An open-ended casing 20 is employed for housing the primary piston 12 and is internally formed with a cylindrical bore 21 along which said piston is reciprocable, the rear end of said bore being shouldered, as at 22, to provide a limit position of retraction for said piston, and the front end of said bore residing at the front end of said casing. Another open-ended casing 24 is employed for housing the secondary piston 14 and is internally formed with a cylindrical bore 25 of substantially lesser diameter than that of the bore 21, as is usual in two-stage compressors. In assembly, the two casings 20 and 24 are removably joined together in end-to-end relationship with the bores 21 and 25 in co-axial alignment.

The primary piston 12, which has a running fit with the wall of the bore 21, is centrally provided with a cylindrical bore 28 in and through which is slidably received, also with a running fit, the rear end of the secondary piston 14, said bore 28 being preferably elongated by structurally extending said piston 12 for providing a proper bearing surface for said piston 14.

The secondary piston 14 is comprised of a rear section 30, which is the portion of said piston having the running fit with the wall of the bore 28, and a front section 31, which is the portion of said piston extending into the bore 25. In assembly, the two sections 30 and 31 of the piston 14 are removably joined together in end-to-end relationship, the rear end of said section 31 being reduced in diameter, as at 32, and threaded thereat, and the front end of said section 30 being formed with a threaded bore 33 for receiving said end 32. Between the front end of the rear section 30 and the shoulder formed on the front section 31 by the provision of the reduced end 32 there is carried, about said end 32, a radially flanged, reenforcing sleeve 34, said sleeve serving as the anchorage for the inner end of an annular, cup-shaped, elastic seal 35. Between the sleeve 34 and the aforementioned shoulder on the section 31 there is preferably carried a reenforcing washer 36. The seal 35, at its inner end, is thereby movable with the movement of the piston 14 and perfectly sealed thereto, said seal extending rearwardly along the surface of the section 30, radially along the forward face of the piston 12, forwardly along the wall of the bore 21, and being stationarily anchored at its outer end between the casings 20 and 24 by and with means similar to the means employed for anchoring the inner end thereof to said piston 14. The seal 35, therefore, prevents any leakage into or out of the system which might otherwise occur due to the movement of the primary piston 12 relatively to the casing 20 or to the movement of the secondary piston 14 relatively to said primary piston.

The rear end of the secondary piston 14, which is the same as the rear end of the section 30 thereof, is formed to receive the front end of a rod 38, said rod being one of the elements of the actuating mechanism 16 by which the compressor 10 is operated, and the rear end of said rod is rigidly, though preferably adjustably, secured to the front end of a rod 39 which is pivotally secured, at its rear end and as shown in Fig. 5, to the conventional brake lever 40 of said actuating mechanism. Rod 38 and piston 14, therefore, move together in accordance with the movement of lever 40. Rod 38, intermediate its ends, has fixed thereto for movement therewith an annular shoulder 42, and freely mounted about said rod rearwardly of said shoulder is the rear end of a forwardly extending cup member 43, said member being rigid and integrally provided at its front end with an annular, rigid, radially outwardly extending flange 44. Rod 38 also carries, rearwardly of the cup member 43, an annular, rigid plate 45, said plate preferably being carried freely on said rod so as not to interfere with the adjustability of said rod with respect to the rod 39. A spring 46, the characteristics of which will presently be described, is telescopically arranged about the rod 38 and is in simultaneous abutment at all times with the plate 45 and the flange 44 on the cup member 43.

Before proceeding further with the description, attention is directed to Fig. 1 wherein the compressor 10 and its elements are shown in position of rest. It will be noted that the spring 46 maintains the plate 45 against the rod 39 and the rear end of the cup member 43 against the shoulder 42, and that the pistons 12 and 14 are so relatively positioned that said piston 12 and the flange 44 of said member 43 are spaced from each other, said piston 12 being in abutment with the shoulder 22 of the bore 21 in the casing 20.

The front section 31 of the secondary piston 14 is formed with an axial, cylindrical bore 48 extending rearwardly from the front end of said section to a position just forwardly of the reduced end 32 of said section, at which rear end of said bore there is provided a plurality of radially spaced openings 49 which communicate the space within said bore with the space without said bore ahead of the seal 35. Fixedly arranged within the bore 48, at the front end thereof and for movement with the piston 14, is an elongated valve support which is preferably in the form of an elongated spider for at least a portion of its length so as to provide integrally inter-joined, concentrically arranged, external and internal sleeve members 50 and 51, respectively. The external sleeve member 50 of the valve support extends forwardly from the front ends of both the piston 14 and the internal sleeve member 51 of said support, the external portion of said sleeve member 50 disposed forwardly of said piston being provided with an annular raised portion 52, the purpose of which is presently described, and the internal portion of said sleeve member 50 disposed forwardly of said sleeve member 51 being tapered, as at 53, for reasons which will presently appear. The internal sleeve member 51 of the valve support, which, because of said support being in the nature of a spider formation, permits communication between both ends of said support through the elongated annulus provided between said sleeve member 51 and the sleeve member 50, freely receives and supports a valve stem 54 for a valve or valve head 55 arranged on the head end of said stem forwardly of the taper 53 of said sleeve member 50.

The outer diameter of the section 31 of the secondary piston 14 is preferably slightly less than the diameter of the bore 25 in the casing 24 so that a flexible seal 58, of sleeve formation, may be arranged therebetween and extend therealong. The rear end of the seal 58 is outwardly flanged to fit over a shoulder formed in the casing 24 at the rear end of the bore 25, said flange being held stationarily in place similarly as is the flanged outer end of the seal 35 except that a nut 59 is additionally necessary and is tightened relatively to the inner wall of said casing into position against the washer 36 of the means used and already disclosed and described. The front end of the seal 58 is serrated, as at 60, to receive the raised portion 52 on the section 50 of the valve support and extends forwardly therefrom to provide an elongated, annular, flexible lip 61 which is free to move with said seal and the piston 14 but which increases in sealing effect with the wall of the bore 25 the greater the pressure thereahead becomes. Between the serration 60 and the lip 61 the seal 58 is integrally formed with an annular, radially inwardly extending, flexible wall portion 62 which resides against the front wall of the valve support section 50 and is open at its center to provide for the passage therethrough of the valve stem 54, said front wall of said section 50 being preferably countersunk at the end of the taper 53 so as to receive a tapered portion 63 of said wall portion 62 and thereby provide sufficient material of flexible nature thereat for the efficient seating of the valve or head 55 thereupon.

The valve or head 55 is tapered to cooperate, under conditions to be described, with the edge of the central opening in the wall portion 62 of the seal 58 and thereby compress the flexible material of said seal thereat, said valve head being fixed on or integral with the stem 54 for movement therewith relatively to its support 50—51 at a position intermediate the ends of said stem. The portion of the stem 54 ahead of the valve head 55 has a flanged sleeve 66 freely carried thereon for movement therealong, and the rear end of said stem has fixed thereon a stop or collar 67 cooperable, under certain conditions to be described, with the rear end of the valve support section 51 to prevent relative movement between said section and said stem. A spring 68, the characteristics of which will be presently described, is telescopically arranged about the front end of the stem 54 ahead of the valve head 55 and in abutting relationship, at its front end, with the casing 24 at the end of the bore 25 and, at its rear end, with the flanged portion of the sleeve 66. Another spring 69, the characteristics of which will also be presently described, is telescopically arranged about the stem 54 in abutting relationship, at its front end, with the valve head 55 and, at its rear end, with the front end of the valve support section 51.

Again referring to Fig. 1, wherein the elements of the compressor 10 are shown in position of rest, it will be noted that both the stop 67 and the valve head 55 are off their seats. This indicates, in the first place, that the fixed distance between these two members is greater than the distance between the rear end of the valve support section 51 and the normal position for the front wall of the wall portion 62 of the seal 58 carrying the tapered section 63. It indicates, in the second place, that the spring 69 is exerting no force upon the valve head 55 at this time. It will also be noted in Fig. 1 that the sleeve 66 is spaced from the valve head 55. This indicates that the spring 68 is exerting no force upon the sleeve 66 at this time.

The casing 24 has an opening 72 which resides directly ahead of the lip 61 of the seal 58, when the system is at rest, such as in Fig. 1, and communicates at that time the entire fluid system with a fluid compensating chamber 73 of well known construction and volume-changing function. The casing 24 also is provided with a pair of openings 74 and 75 disposed at the end of the bore 25 therein, opening 74 being interconnected (see Fig. 5) with a duct 76 leading, as usual, to a wheel cylinder 77 of conventional construction and function, and opening 75 being removably plugged whereby the system may be and is charged and filled with braking fluid.

For bleeding the system of air which, if present in the system, is undesirable for many and well known reasons, the casing 24 is provided with a bleeder opening 80 which is closed by a removable plug 81.

Before describing the operation of the system, attention is called to Fig. 5, which is a diagrammatical illustration of the braking system as a whole with its elements shown in elevation and assembly. A wheel brake of ordinary construction and design is shown, such showing being purely for illustrative purposes, the brake comprising the cylinder 7 in fluid communication with the compressor 10, and said cylinder, that is, the piston therein, being in reactive association, as is usual, with brake shoes 84 mounted for movement in accordance with said piston reactions toward and from a wheel brake drum 85, there being a spring 86 interconnecting said shoes for normally retaining the latter out of engagement with said drum and the relationship of the characteristics of said spring to the springs 46, 68 and 69 being a subject for subsequent discussion.

Referring first to Fig. 1, wherein the system is fully charged with braking fluid and said system is in the position of complete rest, it will be noted that the piston 12 is in fully retracted position, that is, at rest against the stop or shoulder 22 therefor, and the spring 46, though precompressed and having sufficient strength to enable the following described operation to be carried out, has no function at this stage because of its residence between the plate 45, which is forced against the rod 39 by said spring, and the flange 44 of the cup member 43, which cup member is forced against the shoulder 42 by said spring and which flange is spaced from said piston. It will be noted further that the piston 14 is also in fully retracted position, whereat the lip 61 of the seal 58 resides immediately behind the opening 72 to the compensating chamber 73, the valve 54—55 is open, the collar or stop 67 is spaced from the support section 51, the springs 69 and 68 are exerting no force, and the sleeve 66 is spaced from the head of said valve. In this position of rest the entire system is subjected throughout to equal fluid pressure conditions, and the spring 86 is serving to hold the shoes 84 out of contact with the drum 85.

Figure 2 shows the relative positions of the elements of the compressor 10 after the pedal 40 has been depressed slightly more than that amount necessary to eliminate from the system the compensating chamber 73 and the fluid therein. In this view, it will be noted that the piston 14 has been protracted to such an extent that the front end of the lip 61 of the seal 58 lies slightly ahead of the opening 72 to the compensating chamber 73, thereby eliminating from the system any communication with said chamber: During this protraction of the piston 14, the spacing between the piston 12 and the flange 44 of the cup member 43 has been taken up and, upon contact therebetween, the force of the spring 46 has caused said piston 12 to move with said piston 14 the distance indicated in Fig. 2. Such forward movement of the piston 12 by and under the force of the spring 46 has moved the fluid ahead of said piston to cause a further, though limited, opening of the valve 54—55 than is shown in Fig. 1, the collar 67 on the stem 54 abutting the rear end of the inner support section 51 and stopping the relative movement of said valve, the head 55 abutting the sleeve 66 on said stem, and the spring 68 being slightly compressed. This limited, increased opening of the valve 54—55 enables a free movement of fluid therepast without undesirable surges, friction losses and the building up of back pressures, and allows the pressure to build up thereahead for the purpose of diminishing clearances existing between the shoes 84 and the drum 85 for any reason whatsoever.

The inherent and built-up forces of the spring 46 are sufficient to overcome the forces of the springs 68 and 86 and the pressure ahead of the piston 14 required for full clearance take-up between the shoes 84 and the drum 85. In other words, until all clearances between shoes and drums have been fully taken up, there will be substantially no deflection of the spring 46. This means that as long as clearances exist between the shoes and drums of the wheel brakes, the spring 46 will move the piston 12 forwardly with the piston 14 and the valve 54—55 will remain in the position thereof shown in Fig. 2 relative to said piston 14, said valve moving forwardly with said piston 14 because of the pressure behind said valve created by said piston 12 being greater than the pressure ahead of said valve created by the opposition of the springs 68 and 86 until said clearances have been fully taken up.

As soon as the brake shoes actually engage the drums, the pressure ahead of the valve 54—55 increases in value over that of the pressure behind said valve, and said valve closes on the seat therefor formed by the portion 63 of the seal 58 against the slight force of the spring 69. This state of affairs is shown in Fig. 3, but the conditions shown in said figure are also those which occur slightly after the clearances at the wheels have been taken up, that is, at the actual end of the protractile stroke of the piston 14 whereat the actual braking of the wheels is taking place.

So, referring to Fig. 3, it will be noted that the spacing between the shoulder 22 and the piston 12 is greater than that shown in Fig. 2, the difference being accountable by the fact that the fluid displaced by said piston (under the force of the spring 46 which has moved the piston 12 forwardly with the piston 14) is that fluid necessary to take up the clearances at the wheels and has moved forwardly past the valve 54—55 for that purpose. It will also be noted that the rear end of the cup member 43 has become spaced from the collar or shoulder 42 on the rod 38, this spacing being accountable by the fact that the abrupt rise in pressure ahead of the valve 54—55 upon the engagement of the shoes with the drums has overcome the force of the spring 46 and stopped the forward movement of the piston 12 while the piston 14 has continued to move thereafter into the position thereof shown in Fig. 3. This rise in pressure ahead of the valve 54—55, together with the aid of the spring 68, closes said valve, thereby isolating the fluid behind said valve from the fluid ahead of said valve, and any subsequent forward movement of the piston 14 subjects the brakes exclusively to the pressure then created by said piston movement. The forward movement of the piston 14, after the clearances at the brakes have been fully taken up, is necessarily slight and, therefore, immediately effective. The closing of the valve is automatic and depends entirely upon when the clearances have been taken up, so that such closing, without need for attention or adjustment by the operator, will be at the most opportune time for any brake whatever its condition of wear or the spacing between its shoes and drums might be.

When braking is no longer desired, the operator, naturally, releases the pressure on the pedal 40, the forces of the springs 86 and 68 and the pressure ahead of the piston 14 combining to move said piston and the closed valve 54—55 as a unit rearwardly, as shown in Fig. 4. During this rearward movement of the piston 14 the piston 12 remains substantially stationary as long as the pressure ahead of the valve 54—55 is greater than the pressure therebehind, this differential, of course, maintaining said valve in closed position and permitting no exertion of pressure upon said piston 12. At the same time the spring 46 is carried away from the piston 12 by the travelling shoulder 42. As soon as the pressure behind the valve 54—55 becomes greater than the pressure thereahead, this differential together with the aid of the spring 69 serve to open the valve 54—55 and the resulting pressure equalization in the system returns the piston 12 to its normal position against the shoulder 22, the other elements of the compressor 10 by this time having returned to their respective positions of Fig. 1.

Although the invention has been described with some detail it is not intended that such description is to be definitive of the limits of the inventive idea. The right is reserved to make such changes in the details of construction and arrangement of parts as will fall within the purview of the attached claims.

What I claim is:

1. In a compressor for a hydrostatic braking system, a cylinder, a hollow piston carried within said cylinder and reciprocable relatively thereto, said piston having valve seating means at its front end, a hollow valve support carried by and coaxially arranged with respect to said piston for movement therewith and having a front end portion residing behind said valve seating means, a valve carried by and coaxially arranged with respect to said support for movement relatively to said piston and having a head arranged ahead of said valve seating means and cooperable therewith, a spring arranged between said front end portion of said support and the opposing side of said head and active for urging said valve in one direction, and a spring arranged on the opposite side of said head and active for urging said valve in the opposite direction.

2. In a compressor for a hydrostatic braking system, a cylinder, a hollow piston carried within said cylinder and reciprocable relatively thereto, said piston having valve seating means at its front end, a hollow valve support carried by and coaxially arranged with respect to said piston for movement therewith and having a front end portion residing behind said valve seating means, a valve carried by and coaxially arranged with respect to said support for movement relatively to said piston and having a head arranged ahead of said valve seating means and cooperable therewith, a spring of predetermined strength arranged between said front end portion of said support and the opposing side of said head and active for urging said valve forwardly, and a spring of predetermined greater strength arranged on the opposite side of said head and active for urging said valve rearwardly.

3. In a compressor for a hydrostatic braking system, a cylinder, a hollow piston carried within said cylinder and reciprocable relatively thereto, said piston having a front end, a hollow valve support carried by and coaxially arranged with respect to said piston for movement therewith and having a front end residing behind said piston front end, an annular, flexible member arranged on said piston front end and providing a valve seat, a valve carried by and coaxially arranged with respect to said support for movement relatively to said piston and having a head arranged ahead of said member for cooperation with said seat, a spring carried between said support front end and the opposing side of said head for urging said valve forwardly, and a spring carried between the opposite side of said head and the opposing end of said cylinder for urging said valve rearwardly.

4. In a compressor for a hydrostatic braking system, a cylinder, a hollow piston carried within said cylinder and reciprocable relatively thereto, said piston having a front end, a hollow valve support carried by and coaxially arranged with respect to said piston for movement therewith and having a front end residing behind said piston front end, an annular, flexible member arranged on said piston front end and providing a valve seat, a valve carried by and coaxially arranged with respect to said support for movement relatively to said piston and having a head arranged ahead of said member for cooperation with said seat, a spring of predetermined strength carried between said support front end and the opposing side of said head for urging said valve forwardly, and a spring of predetermined greater strength carried between the opposite side of said head and the opposing end of said cylinder for urging said valve rearwardly.

5. In a compressor for a hydrostatic braking system, a cylinder, a hollow piston carried within said cylinder and reciprocable relatively thereto, said piston having valve seating means at its front end, a hollow valve support carried by and coaxially arranged with respect to said piston for movement therewith and having a front end portion residing behind said valve seating means, a valve carried by and coaxially arranged with respect to said support for movement relatively to said piston and having a head arranged ahead of said valve seating means and cooperable therewith and an extension portion projecting forwardly of said head, a spring arranged between said front end portion of said support and the opposing side of said head and active for urging said valve forwardly, a sleeve freely mounted on said extension portion, and a spring arranged between said sleeve and the opposing end of said cylinder and active for urging said valve rearwardly.

CLAUDE SAUZEDDE.